United States Patent [19]

Birchenough

[11] 3,988,093
[45] Oct. 26, 1976

[54] APPARATUS FOR HEAT FORMING A CONTINUOUS WEB OF PLASTIC

[76] Inventor: William D. Birchenough, 104 E. Genesee St., Skaneateles, N.Y. 13152

[22] Filed: Nov. 25, 1974

[21] Appl. No.: 526,907

[52] U.S. Cl. ............................ 425/174.4; 425/388; 264/92
[51] Int. Cl.² ............................................ B29C 3/02
[58] Field of Search ............. 264/92, 90, 284, 292, 264/293; 425/174.4, 387, 388, 437, 453, 454, 384, 385, 325, 326 R, 327, 501, 502, 504, 505

[56] References Cited
UNITED STATES PATENTS

| | | | |
|---|---|---|---|
| 3,113,345 | 12/1963 | Butzko | 425/388 X |
| 3,317,960 | 5/1967 | Kramer | 425/388 X |
| 3,512,335 | 5/1970 | Rorer | 425/504 X |
| 3,562,859 | 2/1971 | McIntyre | 425/388 X |
| 3,608,016 | 9/1971 | Holmstrom et al. | 425/174.4 X |
| 3,619,864 | 11/1971 | Birch | 425/174.4 |
| 3,814,562 | 6/1974 | Diamond | 425/174.4 |

*Primary Examiner*—Robert D. Baldwin
*Assistant Examiner*—Mark Rosenbaum
*Attorney, Agent, or Firm*—Charles S. McGuire

[57] ABSTRACT

A continuous web of heat-deformed plastic is drawn through apparatus wherein a succession of steps are performed in a repeated sequence to form blister or skin package elements. A segment of the web is clamped about a square periphery and heated to a moldable condition. A support is moved vertically to bring into contact with the softened segment either a mold surface for forming blister package segments, or articles of merchandise on supports to be skin packaged. The web clamping frame and vertically movable support are mounted on a horizontally reciprocating carriage which is moved to carry the molded segment of the web to a terminal position and bring a fresh segment into position for heating and forming. The molded segment of the web is cooled and thus assumes its final form as it is moved by the carriage, thereby reducing the overall cycle time.

10 Claims, 18 Drawing Figures

APPARATUS FOR HEAT FORMING A CONTINUOUS WEB OF PLASTIC

BACKGROUND OF THE INVENTION

The present invention relates to plastic packageforming apparatus and, more specifically, to apparatus for treating a continuous web of thermo-plastic material to provide a component of either skin or blister packages.

A wide variety of items are commonly sold in packages at least partly formed of transparent plastic through which the items may be viewed prior to purchase. Among the various types of packages in this category are those known as blister packages, wherein the plastic is formed in a rigid or semi-rigid covering for the item, and skin packages, wherein the plastic is heat-formed in direct contact with the item and/or a supporting element on which it is carried. In blister packages, the plastic is molded and cut to the proper form and later assembled with other portions of the package to enclose the item, usually without direct contact between the packaged item and the plastic. Skin packaging involves direct application of the plastic in a heat-softened state to the item which has previously been placed on a support. The latter commonly consists of a piece of stiff paperboard upon which the item has been laid, and the plastic is applied directly over the surface thereof upon which the item is placed.

Such packaging operations are commonly performed by automatic or semi-automatic machinery. The cost of packaging is ultimately reflected in the cost of the packaged item. Therefore, it is obviously desirable to perform the packaging operation in the most economical manner consistent with the intended function and appearance of the package.

A principal object of the present invention is to provide apparatus for heat forming plastic packaging from a continuous web of thermoplastic material in a more efficient and economical manner than prior art apparatus of the same general type.

A further object is to provide plastic packaging apparatus operable in repeated cycles in such a manner that the overall cycle time is reduced, thereby providing more packages at the same cost.

An additional object is to provide novel and improved plastic forming apparatus particularly directed to heat forming in repeated sequence a continuous web of material in either blister or skin packaging applications.

Still another object is to provide apparatus adapted to perform a repeated heat forming cycle on longitudinal segments of a continuous plastic web according to a novel sequence of operations which allows more efficient utilization of the forming apparatus.

Other objects will in part be obvious and will in part appear hereinafter.

SUMMARY OF THE INVENTION

In accordance with the foregoing objects, the invention comprises apparatus for operating upon a continuous web of plastic in a series of timed steps. Conventional timer apparatus controls the cycle time by actuating solenoid valves in pneumatic lines connected to air cylinders which move various portions of the apparatus. The plastic web is fed in a horizontal plane to a position directly beneath a radiant heater, also movable in a horizontal plane between operative and inoperative positions. Heat is applied for a predetermined time, sufficient to soften the plastic to a moldable condition.

A movable carriage is mounted on supporting tracks and carries a vertically movable platen and a pivoted clamping frame. The latter is moved to grip the side edges and transverse portions of the plastic web about a generally square or rectangular periphery, corresponding to the portion softened by the radiant heater when in its operative position. At the end of the timed heat cycle, the platen is moved upwardly for the mold surface, or other material carried by the platen, to engage the softened portion of the web, which is drawn into forming engagement by vacuum applied through openings in the platen. The carriage is then moved horizontally, carrying with it the web, still engaged by the clamping frame and the surface to which it is molded. During such movement, the vacuum applied through the openings in the platen is changed to a positive flow of air out of the openings, thereby cooling the formed portion of the web and releasing it from the platen or mold surface.

As the carriage reaches the end of its travel, the web is engaged by a pair of stationary grippers, the mold is moved vertically downward to its original position and the clamping frame is moved about its pivotal mounting to release the web. With the web held stationary by the grippers, the carriage is moved horizontally back to its original position, the heater again swings horizontally to its operative position above a fresh segment of the web and the cycle is repeated. The web is released by the grippers as the heater swings to the operative position.

Certain portions of the above-described sequence are applicable only to blister package forming operation, but relatively slight modifications permit use of the apparatus as a skin packaging machine. Such modifications may be selectively made merely by changing the programming unit of the apparatus, thus permitting use of the same machine for either blister or skin packaging, as desired. In either mode of operation, the mold or package-forming portion of the apparatus is moved in the direction of web feed while part of the forming operation is in progress. This combination of the web feed and forming operations in the same time period reduces the overall cycle time, thus providing a greater output in any given time span.

DETAILED DESCRIPTION

The apparatus is supported upon a rigid frame, generally elongated in a horizontal direction and denoted by reference numeral 10. At one end, arbitrarily designated as the rear end, frame 10 includes fixed support members 12 for holding the spindle or axle of roll 14 of thermoplastic material of any well-known type commonly used in blister or skin packaging. The material is pulled from roll 14, which is freely rotatable, and fed in a horizontal plane across the upper part of frame 10, the portion of the material which is removed from the roll being hereinafter referred to as web 16. In the illustrated embodiment, the apparatus is designed to operate with one particular width of material, which is normally supplied in standard widths. However, the apparatus may be modified, within the purview of those skilled in the art, to accommodate different web widths.

Figure 3:
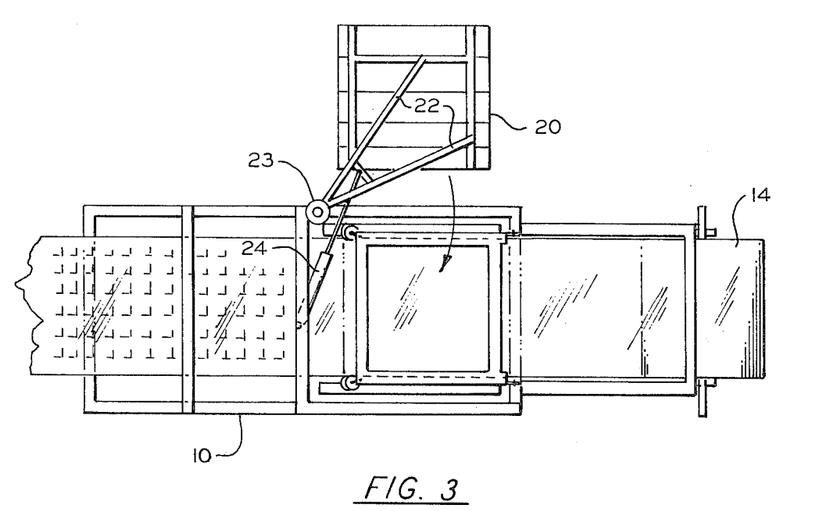
FIG. 3 is a top plan view of the apparatus.
Figure 4:
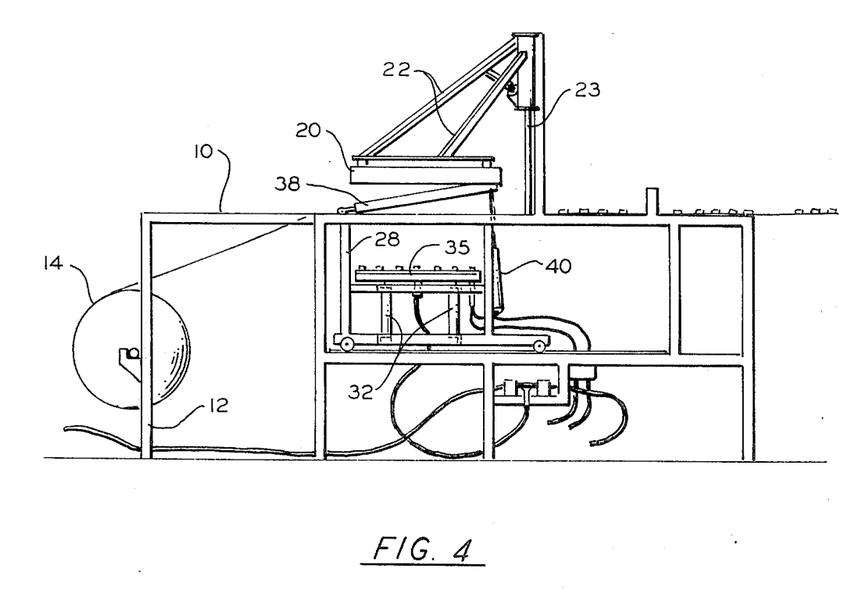
FIG. 4 is an elevational view of the side opposite that shown in FIG. 2.
Figures 5, 6:
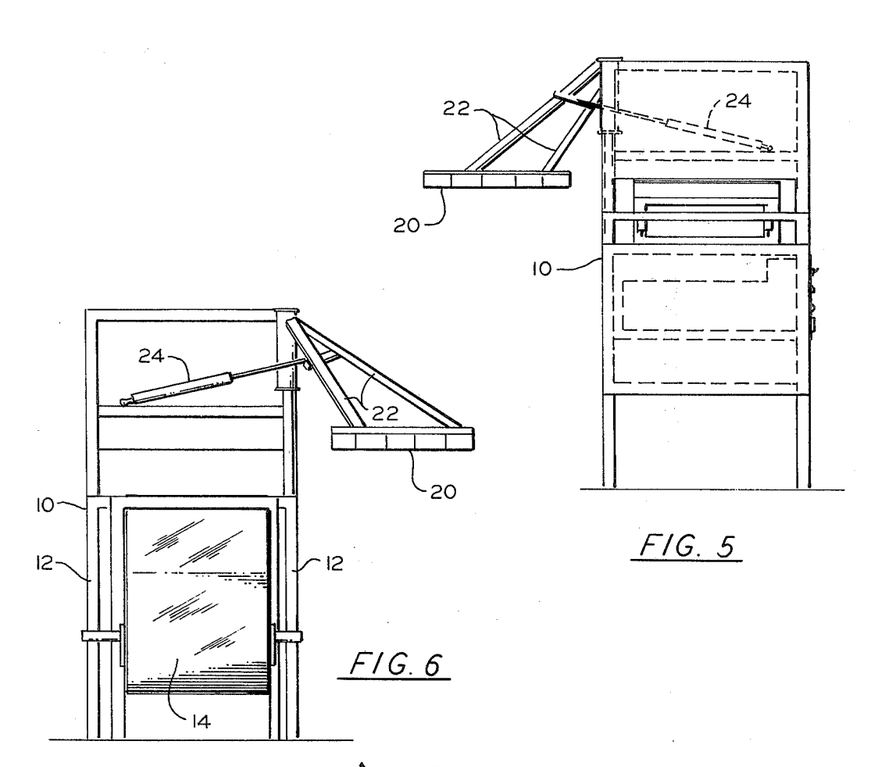
FIGS. 5 and 6 are front and rear elevational views, respectively, of the same apparatus.
Figure 7:
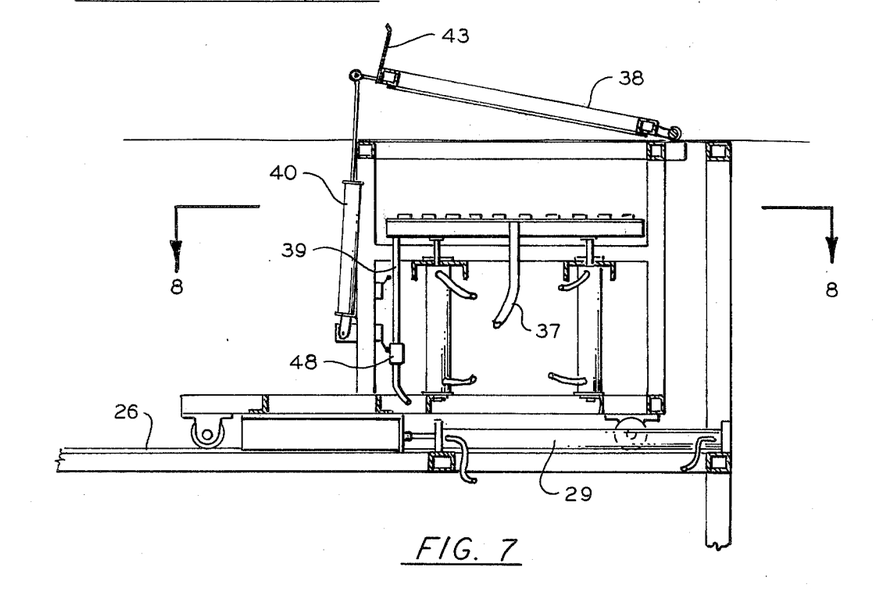
FIG. 7 is a side elevational view of a portion of the apparatus, in section on the line 7—7 of FIG. 8.

Rigidly affixed to an upper portion of frame 10 is heater support frame 18. Radiant heating unit 20 is constructed of conventional components such as electrical resistance heaters arranged to radiate in a downward direction, and having a substantially continuous, square radiating surface having a length and width approximately equal to that of the segments of web 16, which are sequentially heated. Support arms 22 are attached at one end to heating unit 20 and at the other to a cylindrical bearing element mounted on a vertical portion 23 (FIG. 3) of heater support frame 18, forming a vertical axis about which the heating unit is pivotally movable between operative and inoperative positions. Pneumatic cylinder 24 is attached between fixed frame 18 and movable support arms 22, and is extensible and retractable to effect the aforesaid movement.

Figure 8:
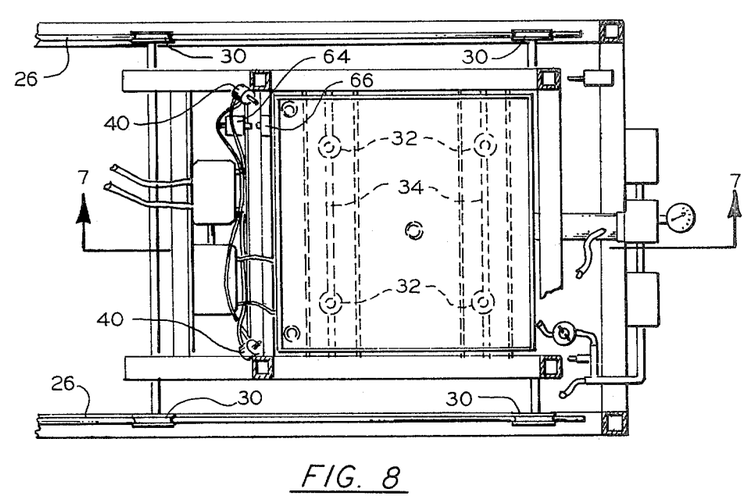
FIG. 8 is a plan view of a portion of the apparatus, in section on the line 8—8 of FIG. 7.

A pair of spaced, horizontal tracks 26 are carried on a lower portion of frame 10. Carriage 28 is mounted for reciprocal movement along tracks 26 between initial and terminal positions by extension and retraction of pneumatic cylinder 29. Carriage 28 is formed essentially as a rigid, cubical frame having a pair of small wheels 30 mounted on each side for rolling movement of the carriage along the tracks. A plurality of vertically disposed pneumatic cylinders 32, preferably four in number, are attached at their lower ends to support bars 34 (FIG. 8), extending between the lower, horizontal, side members of carriage 28, and on their upper, movable ends to platen or mold support 36. The latter supports mold plate 35, fabricated to provide an upwardly facing surface of the configuration desired for forming the plastic, and has a series of openings communicating with line 37 through which either a vacuum or a positive air flow may be provided at the mold surface. Also, water lines 39 are provided in conventional manner for cooling the mold as required. Pivotally attached at the upper, rear end of carriage 28 is open clamping frame 38. Pneumatic cylinders 40 are pivotally attached at their lower ends to a fixed portion of carriage 28 and at their upper, movable ends to each side of clamping frame 38 opposite the pivotal mounting thereof.

Figure 1:
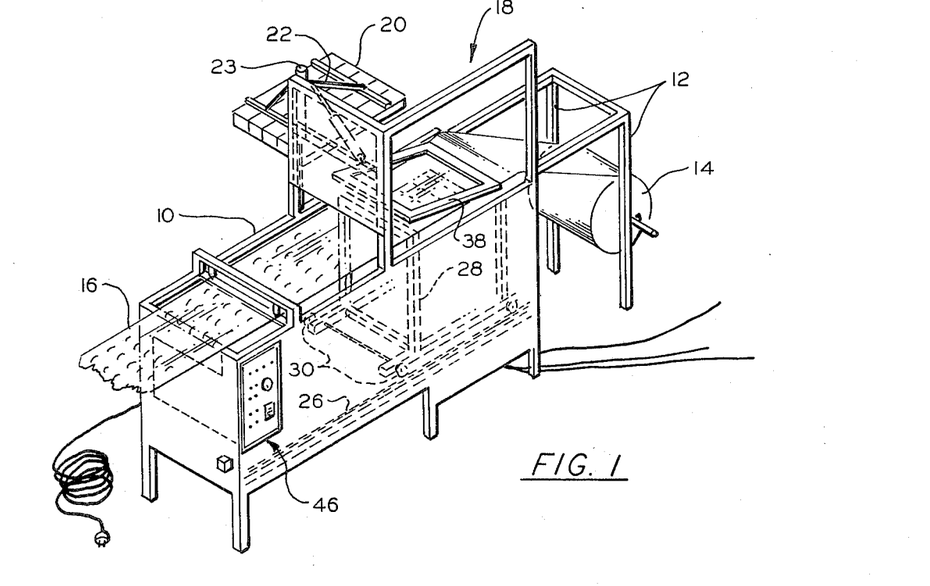
FIG. 1 of the accompanying drawings is a perspective view of a somewhat simplified version of the preferred embodiment of the invention.
Figure 2:
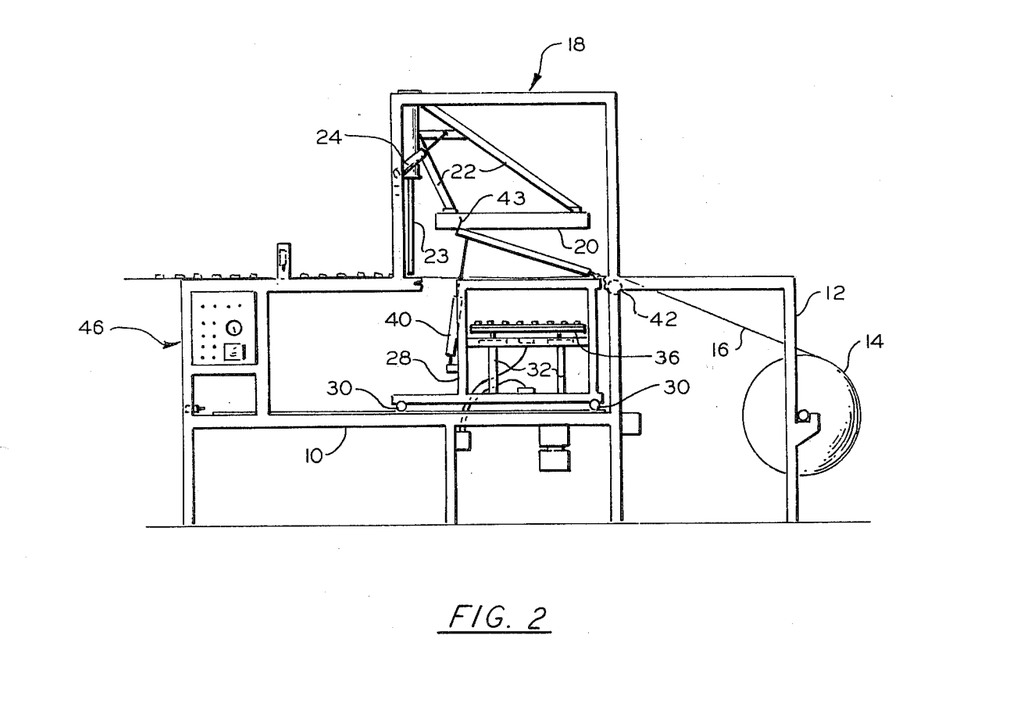
FIG. 2 is a side elevational view of the apparatus of FIG. 1.

Web 16 passes from roll 14 over guide roll 42, (FIG. 2) extending across frame 10 rearwardly adjacent the initial position of the upper side of carriage 28, and extends from the guide roll in a horizontal plane with its side edges riding on the upper surfaces of carriage 28, passing between the carriage and clamping frame 38. The latter is configured with lower surfaces juxtaposed with the upper surfaces of carriage 28 so that web 16 is firmly held between the clamping frame and carriage about a square periphery when the clamping frame is in its lower position.

Heating unit 20 is shown in the inoperative position in FIGS. 1, 3, 5 and 6, positioned to one side of frame 10, with cylinder 24 fully extended. Retraction of the cylinder moves the unit about the vertical axis through member 23 to a position directly above the portion of web 16 lying within the opening defined by clamping frame 38. This is defined as the operative position of heating unit 20, and the heat generated thereby together with the predetermined spacing of web 16 and the downwardly disposed, radiating surface of unit 20, determine the time required for the thermoplastic material to be softened to a moldable condition. Appropriate thermostats, or other temperature control means, are provided for maintaining heating unit 20 at or near the desired temperature. Heat shield 43 extends across the forward edge of clamping frame 38 to prevent heat radiated downwardly from unit 20 from softening the portion of the web forwardly of the frame.

Solenoid valves of conventional design are provided as required in each of the lines to the aforementioned pneumatic cylinders. The valves are electrically actuated at the proper times to extend and retract the cylinders, thereby effecting the operational cycle of the machine. Limit switches, whose function and position will be described in connection with the following explanation of machine operation, are provided to control operation of a control unit which in turn actuates the various solenoid valves. A commercially available control unit suitable for incorporation with the apparatus of the invention is an appropriate model of the Step Programmer available from Automatic Timing and Controls, Inc., of King of Prussia, Pennsylvania. Such units include cam-operated switches with the dwell time of the individual cams adjustable as described in U.S. Pat. No. 3,488,683. The switches are appropriately wired, as described later in more detail, to connect electrical power to the solenoid-operated valves associated with the air lines of the various pneumatic cylinders. The cams are sequentially advanced by a step motor in response to signals from timers or from the aforementioned limit switches contacted by moving elements of the apparatus.

Figure 9:
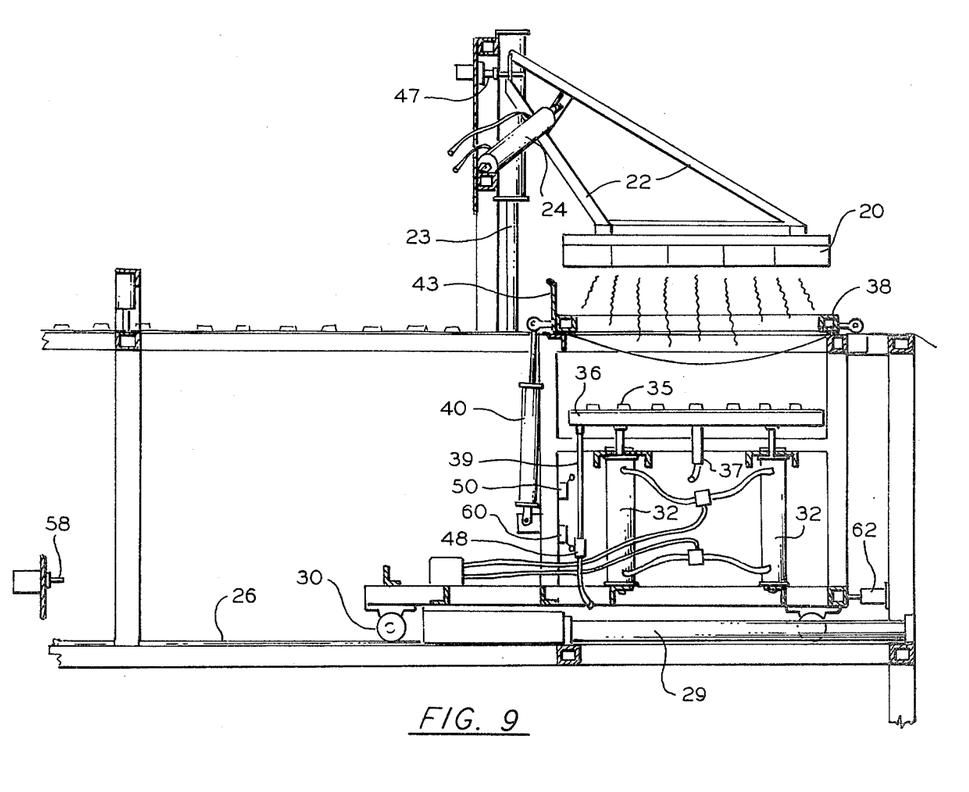
FIGS. 9 through 13 are a series of fragmentary, side elevational views showing various components in different positions of movements to illustrate the operational sequence of the apparatus.

The sequence of operation in forming the molded plastic portions of blister packages will now be explained, with particular reference to FIGS. 9–13. Portions of the apparatus are shown in FIG. 9 with carriage 28 in its initial, or rearmost position and clamping frame 38 lowered to engage web 16 about a square periphery defined by the frame. Heating unit 20 is in its operative position to radiate heat downwardly upon the portion of the web within frame 38. As the material of web 16 is softened by the heat, it will begin to sag within the boundaries of frame 38 as indicated in FIG. 9.

The time interval of heat application is controlled by a time delay relay associated with the control unit, which is mounted at the forward end of frame 10 and denoted generally by reference numeral 46. The time delay relay is actuated to begin the time of operation by contact of heating unit 20 with limit switch 47 upon movement of the heating unit from the inoperative to the operative position. Upon expiration of this time period the time delay relay closes to provide power to advance the step motor one increment. One of the cams thereby closes a switch to actuate the solenoid controlling air supply to the lower ends of cylinders 32. Platen 36 is then raised to the position of FIG. 10, engaging across the forming surface of mold plate 35 the softened portion of web 16. The same or a concurrently actuated switch also serves to actuate the solenoid controlling air supply to cylinder 24, thereby swinging heating unit 20 to the inoperative position.

Figure 10:
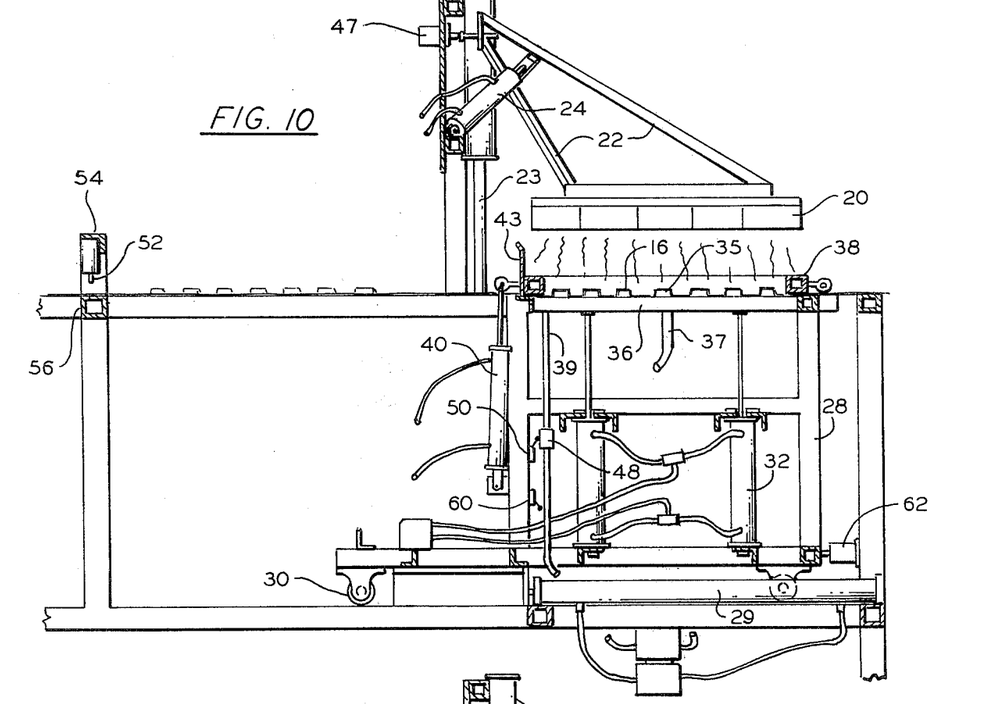

Collar 48 is affixed to water line 39 and travels vertically as platen 36 is raised and lowered. At the upper end of travel of platen 36, limit switch 50 is contacted by collar 48 and closed to provide power for advancing the step motor of control unit 46. One of the cams thus closes a microswitch to actuate the solenoid connecting line 37 with the vacuum source to draw the softened thermoplastic into close engagement with the surface of mold plate 35. On the same increment of motor advance, another microswitch is closed to actuate the solenoid valve in the air line to a pair of pneumatic grippers 52 arranged on rigid support 54 for engaging the marginal edges of web 16 against cross member 56 of frame 10. The grippers are raised, i.e., the web is released, at this point in the operation, as shown in FIG. 10.

The time delay relay again controls the period of application of the vacuum, being actuated to begin the time period upon closure of limit switch 50. At the expiration of this period, the step motor is advanced to close another microswitch actuating solenoids controlling the air supply to extend cylinder 29 and to change the connection of air line 37 from the vacuum to a pressurized air source. Thus, as carriage 28 is advanced from its initial position toward the terminal position, a positive air flow through the openings in the mold surface cools and hardens the plastic and assists in releasing it from the mold.

Figure 11:
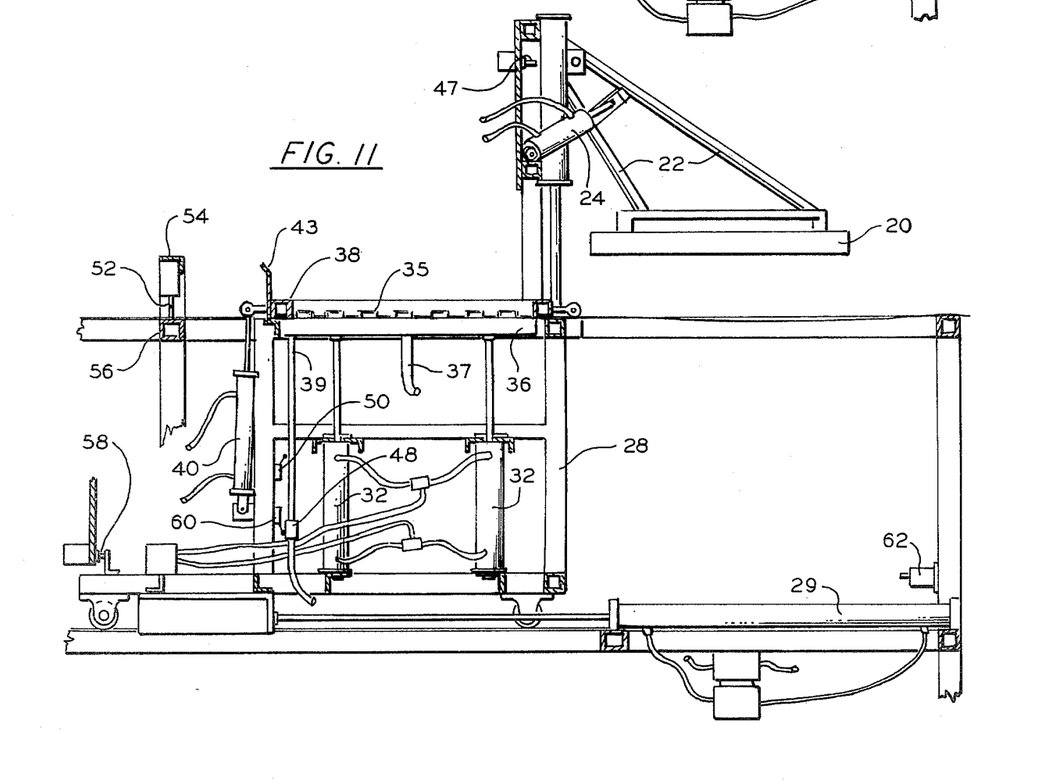

When carriage 28 reaches its terminal position, cylinder 29 is at its maximum extension, and a fixed portion of the carriage contacts limit switch 58, as shown in FIG. 11. This provides power to advance the step motor and cause another cam to close a microswitch actuating solenoids in three lines. Grippers 52 are actuated to engage the marginal edges of web 16, the air supply through line 37 is turned off, and air is provided to the upper ends of cylinders 32 to retract these cylinders and lower platen 36.

Figure 12:
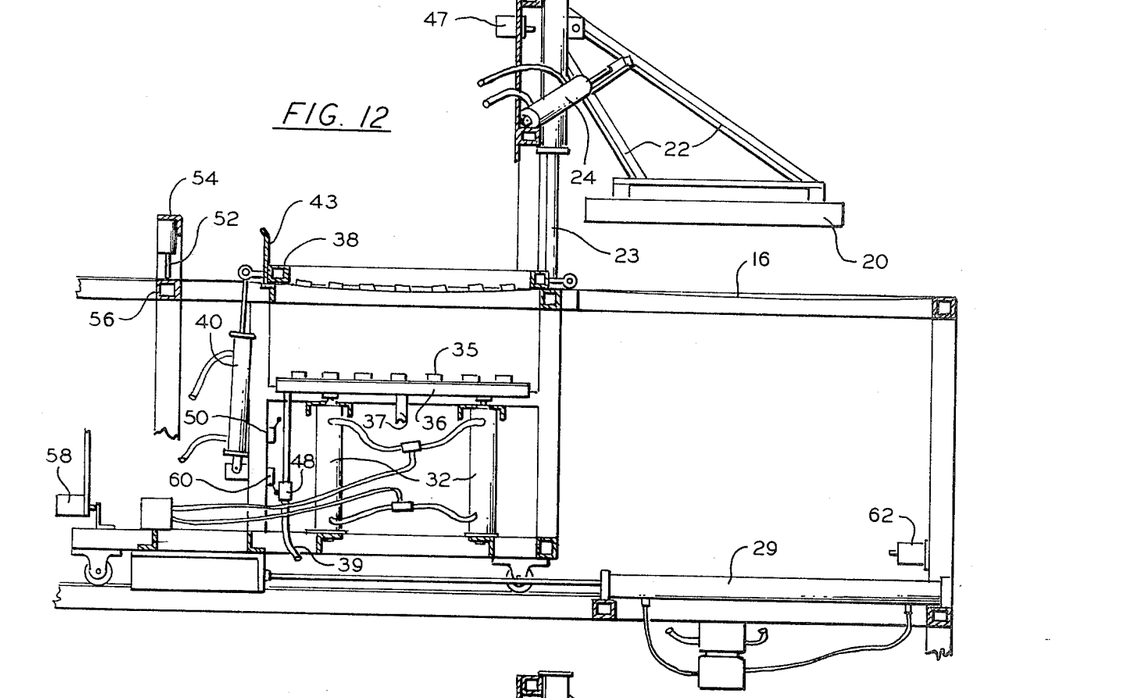
Figure 13:
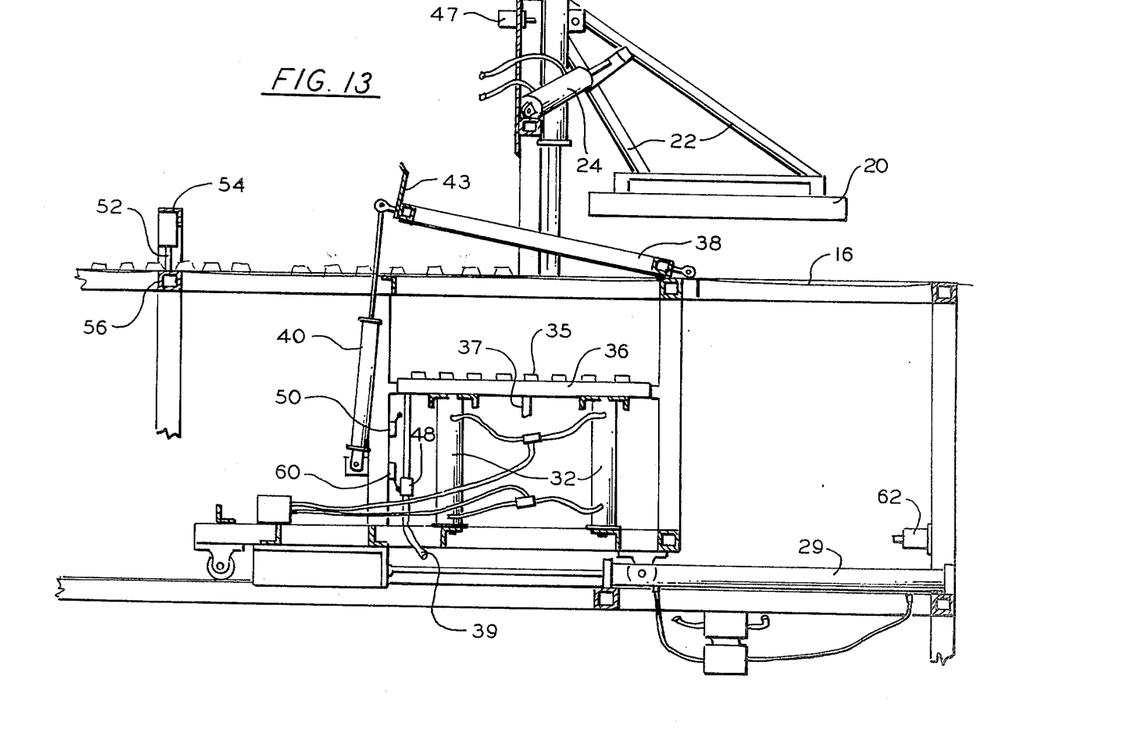

The elements are shown in FIG. 12 with grippers 52 engaging web 16 and platen 36 lowered. Collar 48 contacts limit switch 60 at the lower end of travel of platen 36, thereby advancing the step motor increment and closing another microswitch. This actuates solenoids controlling the air supply to extend cylinders 40, thereby opening frame 38, and to retract cylinder 29, thereby moving carriage 28 back toward its initial position. The elements are shown in FIG. 13 with frame 38 open, or raised, web 16 engaged by grippers 52, and carriage 28 moving toward the right, i.e. toward its initial position. Platen 36 is in its lower position, and neither the vacuum nor the pressurized air source are connected through line 37 to the openings in platen 36 and mold plate 35.

When carriage 28 reaches its initial position, cylinder 29 is fully retracted and a portion of carriage 28 contacts limit switch 62. The step motor is again advanced and another microswitch is closed to actuate the solenoid valve controlling the air supply to retract cylinders 40, closing frame 38 about a fresh segment or web 16. The air supply to cylinders 40 is also provided to a pneumatic plunger, seen in FIG. 8 and designated by reference numeral 64, which is thereby extended to contact limit switch 66. This advances the step motor once more to close a microswitch actuating the solenoid valve retracting cylinder 24, swinging heating unit 20 to the operative position above the new segment of web 16 engaged by frame 38. The elements are again in the position of FIG. 9, and the time for which heat is applied is controlled by the time delay relay.

Figure 14:
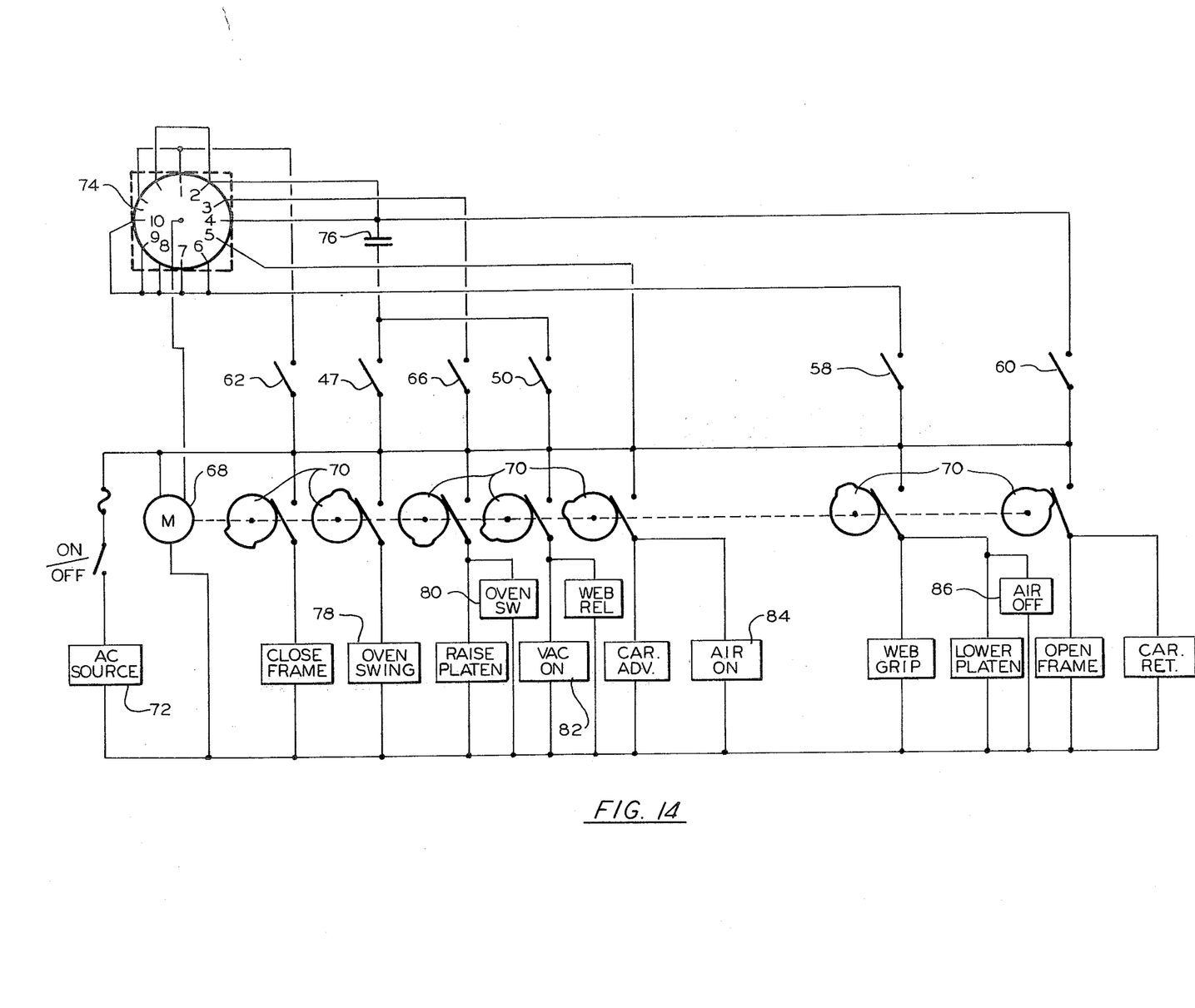
FIG. 14 is a partly schematic, partly diagrammatic showing of the electra-mechanical operation of the apparatus.

The operational sequence may be better understood by reference to the schematic diagram of FIG. 14. Common reference numerals are used for the limit switches shown schematically in FIG. 14 and in their actual positions on the apparatus in other Figures. The step motor of the control unit is indicated by reference numeral 68, and has an output shaft upon which all of cams 70 are mounted. Each cam is arranged to actuate an associated microswitch. The limit switches connect motor 68 to power source 72 through pin connector 74, also a part of control unit 46. The time delay relay is schematically indicated in FIG. 14 at 76.

The blocks connected to each of the cam-actuated microswitches in FIG. 14 are indicative of the machine function which is effected by closure of the microswitch. These blocks may be considered as equivalent to the solenoids controlling operation of the valves, but since the diagram is indicative of the operational sequence or functions, more than one block may represent the same solenoid. For example, blocks 78 and 80, indicating movement of the oven or heating unit 20 to the operative and inoperative positions, respectively, would refer to actuation of the same solenoid controlling both extension and retraction of cylinder 24. Likewise, blocks 82, 84 and 86 all relate to the control of the valve in line 37.

As mentioned earlier, the apparatus may be modified to perform skin packaging operations. Without changing any structure of the web heating, forming, and transporting apparatus, the cams of the programmer are repositioned to alter the sequence of movement of certain elements. Additionally, one or more support elements not previously described, are provided to insure that the web and elements attached thereto remain in the desired horizontal plane. Instead of the mold plate with the upper surface formed in the shape to which the plastic web is to be formed, the items to be packaged are placed directly upon platen 36. In accordance with the usual practice is skin packaging operations, an article of merchandise is placed on an air-permeable support, usually a piece of perforated paper board. The latter may be printed on one or both sides with material describing or promoting the article, since both the paper board and the article are part of the finished package.

Figure 17:
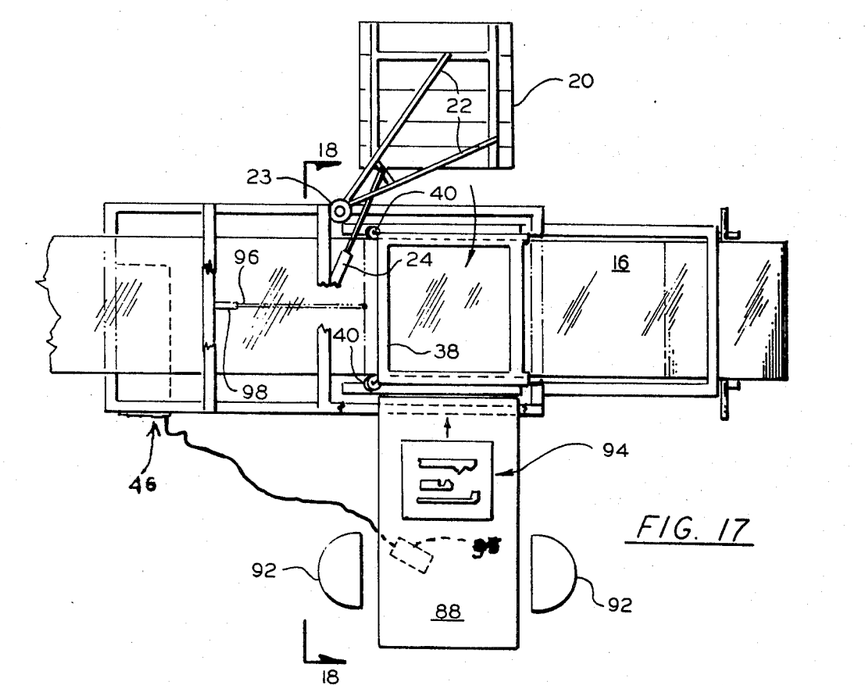
FIGS. 17 and 18 are plan and front sectional views, respectively, of the apparatus of FIGS. 15 and 16.
Figure 18:
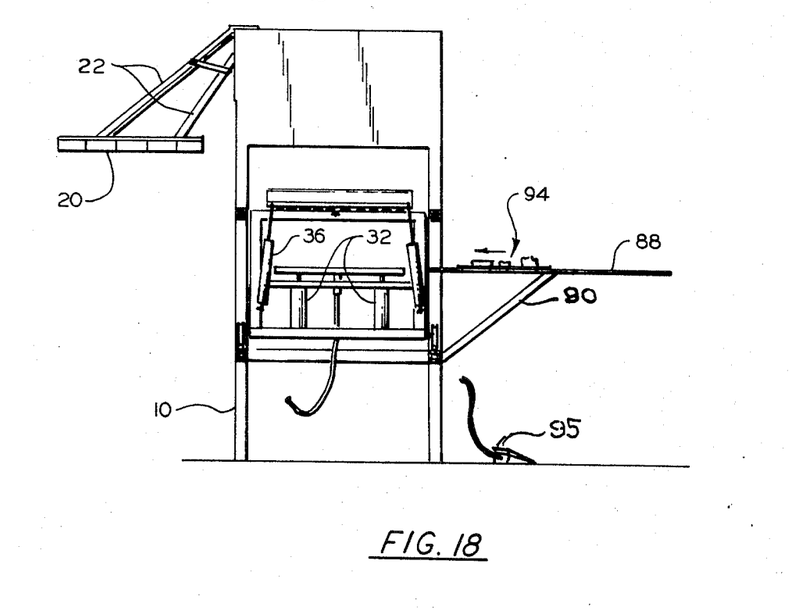

The individual pieces of paper board and articles of merchandise may be loaded onto support 36 in any convenient manner while carriage 28 is at its initial position and support 36 is lowered, i.e., at the commencement of each cycle. For example, as indicated in FIGS. 17 and 18, table 88 is supported upon frame 10 by braces 90 with its upper surface coplanar with that of support 36, with the latter in its lowered position. Operator stations, indicated by reference numeral 92, are provided on one or both sides of table 88. The articles of merchandise to be skin packaged are manually placed on the porous or perforated card, the composite card and articles being indicated generally by reference numeral 94.

After one or more cards are loaded, they are slid either manually or automatically from table 88 to support 36. Since manual operations are involved in this mode of the invention, it may be desirable to provide means under the control of the operator for initiating each cycle or the machine. Such means may comprise, for example, a switch incorporated in a foot pedal, shown in FIGS. 17 and 18 and indicated by reference numeral 95, appropriately connected to control unit 46. Thus, as soon as the operator is ready for the machine to begin a packaging cycle, he depresses the switch in foot pedal 95, thereby actuating the programmer to move to the first position for automatic sequencing of a complete cycle. The programmer is also arranged in known manner to stop at the completion of a cycle until once again actuated through the switch in foot pedal 95.

Web 16 is clamped and heated in the same manner as in the previously described blister package forming operation. At the expiration of the heating time period, cylinders 32 are extended to raise support 36 until the lower surface of the heated portion of the web covers and contacts the articles and paper board carried by the support. Vacuum is applied through line 37 and operates through the porous or perforated paper board to draw the web into close engagement with the upper surface thereof, covering and contacting the articles thereon.

Although these operations are essentially the same as when the machine is used for blister packaging, better results in skin packaging may be obtained if heating unit 20 remains in the operative position for a short time after the platen is raised and the vacuum applied. This may be accomplished by providing an additional time delay relay in the circuit in conventional manner. Limit switch 66 is contacted by pneumatic plunger 64, as previously described, to actuate the valve in the vacuum line and the other time delay relay. Cylinder 29 advances carriage 28 after the preset time delay.

Figure 15:
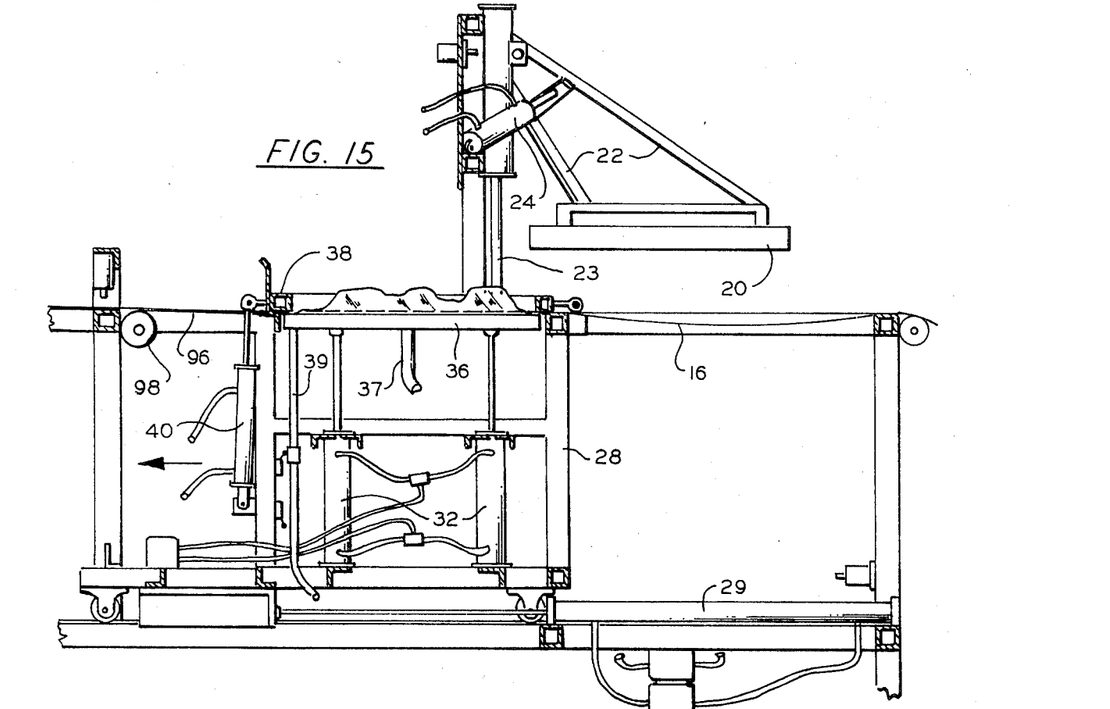
FIGS. 15 and 16 are fragmentary, side elevational views of a modified form of the apparatus shown in different positions.

The web cools and solidifies during travel of carriage 28 toward its terminal position, as shown in FIG. 15. There is normally no need for a positive air flow through line 37, as in blister package forming. Therefore, the programmer is adjusted to close the valve to the vaccum supply at the proper time without connecting line 37 to the air supply. Upon contact of carriage 28 with limit switch 64, the carriage stops in its terminal position, grippers 50 are actuated to engage the edges of the web, and cylinders 40 are actuated to raise the forward end of clamping frame 38.

Since the packages themselves, i.e., the paper board and articles of merchandise, are affixed to the lower surface of the web, means are provided to support this portion of the web after removal of platen 36. The sequence of movement is changed at this point from that employed in blister package forming. Rather than lowering platen 36 while carriage 28 is in its terminal position, cylinder 29 is actuated to commence movement of the carriage back toward its initial position with platen 36 still in the upper position.

One or more supports are also employed when the apparatus is used for skin packaging. In the form shown in FIGS. 15 and 16, support element 96 is affixed to the forward side of carriage 28 immediately below the upper, web-contacting surface thereof. Element 96 is in the nature of a flexible spring which is self-biased to wind and unwind upon spindle 98 as carriage 28 moves between its initial and terminal positions. Element 96 may, of course, take other forms such as a telescoping rod, or the like, but in any event it is arranged directly beneath the portion of the web carrying the packaged items upon movement of carriage 28 away from its terminal position.

Figure 16:
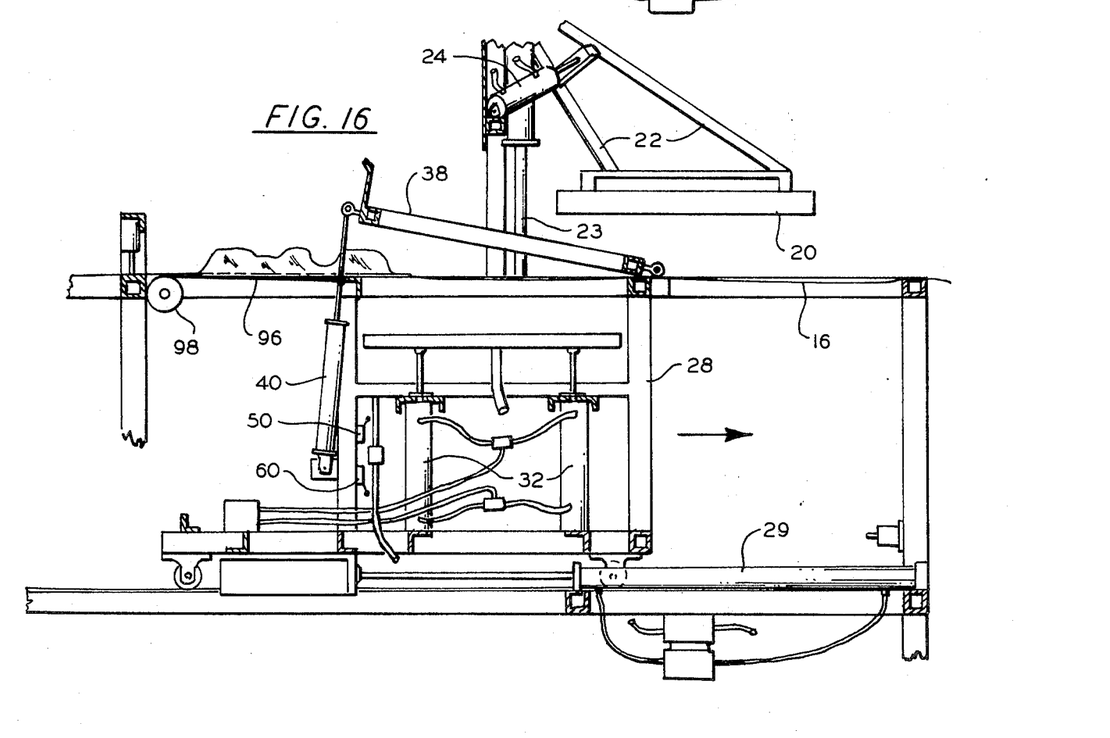

As carriage 28 begins to move, platen 36 remains in contact with the lower surface of card 94. Element 96 is extended to support such items as the carriage moves. After carriage 28 has moved a sufficient distance, element 96 will be extended far enough to serve as the sole support for the packaged items on the lower side of the web. At this time, cylinders 32 are actuated to move platen 36 back to the lower position. The elements are shown in FIG. 16 in an intermediate position, with carriage 28 traveling toward its initial position. Element 96 supports the packaged items, indicated generally by reference numeral 94, and platen 36 is moving toward the lower position. Movement is preferably timed so that platen 36 is in the fully lowered position when carriage 28 arrives at its initial position. New paper board carrying items to be packaged is then loaded on platen 36 and a new cycle begins upon actuation by the operator of foot pedal 95.

What is claimed is:
1. Apparatus for heat forming a continuous web of thermoplastic material in a repeated sequence, said apparatus comprising, in combination:
   a. frame means supporting the web for movement in a longitudinal direction and in a horizontal plane;
   b. heating means arranged to direct downwardly upon a predetermined portion of the web at a fixed station in the path of web travel, sufficient heat to soften the material to a moldable condition;
   c. carriage means mounted upon said frame means for reciprocal linear movement in said longitudinal direction between an initial position at said fixed station, and a terminal position;
   d. clamping means associated with said carriage and movable therewith, and further movable relative to said carriage means between a first position wherein marginal portions of the web surrounding said predetermined portion are firmly engaged by said clamping means, and a second position wherein said clamping means is spaced from the web;
   e. forming means associated with said carriage and movable therewith, and further movable relative to said carriage means between a raised position wherein an upwardly facing portion of said forming means is substantially coplanar with said horizontal plane, and a lowered position wherein said upwardly facing portion is spaced downwardly from the said horizontal plane;
   f. means for cooperatively moving said carriage, said clamping means and said forming means in a repeated sequence to engage the web at said fixed station, to elevate said forming means to its raised position, to move said carriage means and thereby the web in said longitudinal direction to said terminal position, to release the engagement of the web by said clamping means, to move said forming means to its lowered position, and to move said carriage means back to said initial position; and g. means fixedly engaging the web during movement of said carriage from said terminal to said initial position.

2. The invention according to claim 1 and further including means for moving said heating means between an operative position, spaced vertically above said fixed station, and an inoperative position, spaced laterally from said operative position.

3. The invention according to claim 2 wherein said heating means comprises a radiant heater having a substantially planar, downwardly directed surface, and said means for moving said heating means comprises mounting means including a fixed vertical axis and means for rotating said heater about said axis between said operative and inoperative positions.

4. The invention according to claim 1 wherein said clamping means comprises an open rectangular frame having a lower surface positioned substantially in said horizontal plane in the first position of said clamping means.

5. The invention according to claim 4 wherein said rectangular frame is pivotally attached to said carriage means for movement relative thereto between said first and second positions.

6. The invention according to claim 1 wherein said engaging means comprise a pair of gripper members arranged adjacent the marginal edges of the web and movable into engagement therewith.

7. The invention according to claim 1 and further including an air line communicating with said forming means, and valve means operable to connect said air line with either of a pressurized air source and a vacuum source.

8. The invention according to claim 7 wherein said valve means is operable to connect said air line with said air source during movement of said carriage from said initial to said terminal position.

9. The invention according to claim 5 and further including a radiation shield attached to a portion of said rectangular frame and positioned to shield a portion of said web outside said rectangular frame from heat radiated by said heating means.

10. The invention according to claim 1 and further including a loading station comprising a horizontal surface laterally adjacent and substantially coplanar with the upper surface of said forming means in the lowered position thereof and said carriage means is in its initial position.

* * * * *